US007000596B2

(12) United States Patent  (10) Patent No.: US 7,000,596 B2
Zurloye et al.  (45) Date of Patent: Feb. 21, 2006

(54) METHOD AND APPARATUS FOR CONTROLLING AN INTERNAL COMBUSTION ENGINE USING COMBUSTION CHAMBER PRESSURE SENSING

(75) Inventors: Axel Zurloye, Columbus, IN (US); Dave Ruthmansdorfer, Freetown, IN (US); Tim Frazier, Columbus, IN (US); Jennifer Rumsey, Greenwood, IN (US)

(73) Assignee: Cummins Westport Inc., Vancouver (CA)

( * ) Notice: Subject to any disclaimer, the term of this patent is extended or adjusted under 35 U.S.C. 154(b) by 9 days.

(21) Appl. No.: 10/679,026

(22) Filed: Oct. 3, 2003

(65) Prior Publication Data

US 2005/0072402 A1  Apr. 7, 2005

(51) Int. Cl.
*F02P 5/153* (2006.01)
(52) U.S. Cl. ................ 123/435; 123/299; 123/406.42; 701/105
(58) Field of Classification Search ................ 123/435, 123/406.41, 406.42, 299; 701/105
See application file for complete search history.

(56) References Cited

U.S. PATENT DOCUMENTS

| 3,707,953 | A | | 1/1973 | Rhoades, Jr. et al. |
|---|---|---|---|---|
| 4,314,534 | A | | 2/1982 | Nakajima et al. |
| 4,449,501 | A | * | 5/1984 | Greeves ................ 123/406.42 |
| 4,556,030 | A | | 12/1985 | Aono |
| 4,606,312 | A | | 8/1986 | Nakano et al. |
| 4,621,603 | A | | 11/1986 | Matekunas |
| 4,622,939 | A | | 11/1986 | Matekunas |
| 4,624,229 | A | | 11/1986 | Matekunas |
| 4,651,562 | A | | 3/1987 | Day |
| 4,658,794 | A | | 4/1987 | Day |
| 4,920,494 | A | | 4/1990 | Abo et al. |
| 4,928,653 | A | * | 5/1990 | Ohkubo et al. ............. 701/104 |
| 5,218,945 | A | | 6/1993 | Kapellen et al. |
| 5,245,969 | A | | 9/1993 | Nishiyama et al. |

(Continued)

FOREIGN PATENT DOCUMENTS

EP  0 967 372  12/1999

(Continued)

OTHER PUBLICATIONS

An experimental study of premixed lean diesel combustion. Shimazaki, Naoki; Akagawa, Hisashi; Tsujimura, Kinji. New ACE Institute Co., Ltd., Japan. Society of Automotive Engineers, [Special Publication]SP (1999), SP-1444(Processes of Diesel Engine Combustion), 1-10; Abstract.

(Continued)

*Primary Examiner*—Erick Solis
(74) *Attorney, Agent, or Firm*—McAndrews, Held & Malloy, Ltd.

(57) ABSTRACT

The present method and apparatus employ a signal indicative of cylinder pressure within the combustion chamber of an internal combustion engine to control combustion phasing or start of combustion (SOC) in subsequent cycles of the engine where the engine is driven by combustion of both a fuel/air premixed charge and a directly injected quantity of fuel. A ratio of signals indicative of pre-combustion pressure and post-combustion pressure within a cycle are employed to estimate SOC and then, based on a predetermined target SOC, an ignition lever is employed to adjust subsequent SOC. A preferred ignition lever is, in a pilot fuel ignited engine, pilot fuel quantity.

58 Claims, 5 Drawing Sheets

U.S. PATENT DOCUMENTS

| | | |
|---|---|---|
| 5,474,054 A | 12/1995 | Povinger et al. |
| 5,533,492 A | 7/1996 | Willey et al. |
| 5,542,392 A | 8/1996 | Povinger |
| 5,588,416 A | 12/1996 | Suzuki et al. |
| 5,615,655 A | 4/1997 | Shimizu |
| 5,622,053 A | 4/1997 | Freen |
| 5,623,819 A | 4/1997 | Bowker et al. |
| 5,735,245 A | 4/1998 | Kubesh et al. |
| 5,765,532 A | 6/1998 | Loye |
| 5,785,031 A | 7/1998 | Akimoto et al. |
| 5,791,145 A | 8/1998 | Freen |
| 5,832,880 A | 11/1998 | Dickey |
| 5,875,743 A | 3/1999 | Dickey |
| 5,878,717 A | 3/1999 | Zur Loye |
| 5,992,388 A | 11/1999 | Seger |
| 6,032,617 A | 3/2000 | Willi et al. |
| 6,230,683 B1 | 5/2001 | zur Loye et al. |
| 6,243,641 B1 | 6/2001 | Andrews et al. |
| 6,276,334 B1 | 8/2001 | Flynn et al. |
| 6,286,482 B1 | 9/2001 | Flynn et al. |
| 6,289,877 B1 | 9/2001 | Weisbrod et al. |
| 6,354,268 B1 | 3/2002 | Beck et al. |
| 6,367,317 B1 | 4/2002 | Jaye |
| 6,408,625 B1 | 6/2002 | Woon et al. |
| 6,516,774 B1 | 2/2003 | zur Loye et al. |
| 6,516,781 B1 | 2/2003 | Weisman |
| 6,560,526 B1 | 5/2003 | Matekunas et al. |
| 6,561,157 B1 | 5/2003 | zur Loye et al. |
| 6,598,468 B1 | 7/2003 | Zur Loye et al. |
| 6,640,773 B1 | 11/2003 | Ancimer et al. |
| 6,659,071 B1 | 12/2003 | LaPointe et al. |
| 6,810,320 B1 * | 10/2004 | Yamamoto et al. ......... 123/435 |
| 2001/0017123 A1 | 8/2001 | Raab et al. |
| 2001/0017127 A1 | 8/2001 | Flynn et al. |
| 2002/0020388 A1 | 2/2002 | Wright et al. |
| 2002/0026926 A1 | 3/2002 | Loye et al. |
| 2002/0040708 A1 | 4/2002 | Chmela et al. |
| 2002/0053336 A1 | 5/2002 | Nogi et al. |
| 2002/0078918 A1 | 6/2002 | Ancimer et al. |

FOREIGN PATENT DOCUMENTS

| | | |
|---|---|---|
| EP | 0 904 484 | 4/2001 |
| JP | 8284704 | 10/1996 |
| JP | 11036939 | 2/1999 |
| JP | 11148382 | 6/1999 |
| JP | 11270412 | 10/1999 |
| JP | 11294222 | 10/1999 |
| JP | 2001-107809 | 4/2001 |
| WO | WO 93/08399 | 4/1993 |
| WO | WO 00/61927 | 10/2000 |
| WO | WO 01/83974 | 11/2001 |
| WO | WO 01/86125 | 11/2001 |
| WO | WO 01/86126 | 11/2001 |
| WO | WO 01/86127 | 11/2001 |
| WO | WO 01/86128 | 11/2001 |

OTHER PUBLICATIONS

Auto-ignition and combustion of DME and n-butane/air mixtures in homogeneous charge-compression ignition engine. Igarashi, Tetsuya; Iida, Norimasa. Kelo Gijuku Univ.Grad.Sch., Yokohama, Japan. Nippon Kikai Gakkai Ronbunshu, B-hen (1998), 64(618, 605-612; Abstract.

Alternative combustion systems for piston engines involving homogeneous charge compression ignition concepts—a review of studies using methanol, gasoline and diesel fuel. Pucher, Greg R.; Gardiner, David P.; Bardon, Michael F.; Battista, Vittoria. Thermotech Engineering, Can. Soc. Automot.Eng.,[Spec.Publ.]SP (1996), SP-1208(Topics in Alternative Fuels and Their Emissions), 215-225; Abstract.

Explosions initiation in homogeneous fuel-Oxidant gaseous combinations. I.Explosions initiation with heated bodies. Razus D, Oancea D, Ionescu NI, Revista De Chimie, 51(8): 590-599 Aug. 2000; Chiminform Data S A, Bucharest, Website; Abstract.

Numerical modeling of premixed gaseous combustion by the boundary-domain integral method. Samee N, Skerget L. Combustion Theory and Modelling; 3(1):Mar. 1-12, 1999; IOP Publishing LTD., Bristol; Website; Abstract.

Monte Carlo computation of turbulent premixed methane-air ignition. Carmen CL, Feikema DA; Combustion Explosion and Shock Waves; 34(3)253-259 May-Jun. 1998; Plenum Publ corp, New York; Website; Abstract.

* cited by examiner

METHOD AND APPARATUS FOR CONTROLLING AN INTERNAL COMBUSTION ENGINE USING COMBUSTION CHAMBER PRESSURE SENSING

FIELD OF THE INVENTION

The present invention relates to a method and apparatus for controlling the start of combustion (or another measure indicative of combustion phasing) of an internal combustion process using sensor signals that are indicative of the pressure found in the combustion chambers of internal combustion engines. The combustion process generally involves combustion of a premixed charge of fuel and air supplemented by combustion of a directly injected quantity of fuel.

BACKGROUND OF THE INVENTION

Compression ignition or auto-ignition of a lean fumigated or lean premixed charge of fuel, once ignited, has the potential to burn while producing fewer pollutants such as oxides of nitrogen (NOx) and particulate matter (PM) than is the case for a non-premixed charge. Controlling ignition of such charges in an internal combustion engine can be difficult, however. Early ignition of a premixed charge during the compression stroke of the piston can result in overpressure, excessive pressure oscillations (typically referred to as engine knock) and subsequent engine damage. As such, conventional internal combustion engine strategies employ premixed charges in cylinders with relatively low compression ratios thus inhibiting both early pre-ignition and what is often referred to as auto-ignition of the end-gas (or portions of the fresh fuel and air mixture that burn late in the combustion cycle). This helps keep pressures and temperatures in the cylinder within a range that provides more control over the combustion rate (hence eliminating or limiting the magnitude of engine knock). These engines typically initiate combustion with a spark plug and rely upon flame propagation to consume the fuel to near completion, theoretically placing a lower limit on how fuel-lean the fresh charge can be without incurring a significant loss in combustion efficiency. However, by limiting the compression ratio and restricting how fuel-lean the premixed charge can be prepared, the performance of the engine can also be limited and result in combustion that can be more polluting than is the case for combustion arising from auto-ignition of a fuel-air mixtures that is prepared with a fuel to air ratio below the theoretical lean propagation limit.

Conversely, premixed charges have been employed in engines with higher diesel-like compression ratios. The fueling strategies employed with such engines seek to avoid excessive knocking that can negatively affect the engines in other ways, however. For example, knock intensity in high compression ratio engines can be limited by limiting the fuel-lean equivalence ratio such that excessive engine knock will not be problematic for the premixed fuel introduced into the combustion chamber. This, however, can affect the engine operating load range. Other strategies affect performance, increase system complexity, and/or increase costs.

One method of utilizing the clean burn of a lean premixed charge while avoiding losses in performance is to combine the method above that employs higher diesel-like compression ratios with a diffusion combustion strategy (see U.S. Patent Application Publication No. US 2002/0078918 A1). As mentioned above, a premixed fuel/air charge (prepared to a fuel-lean equivalence ratio where excessive engine knock will not be problematic) is introduced into a high compression ratio engine. In order to supplement energy limited by the "excessive knock limit" of the premixed charge, additional combustion energy is provided by a quantity of fuel directly injected into the combustion chamber when the piston is at or near top dead center. The resulting burn of the directly injected fuel will, for the most part, be a diffusion burn of this fuel, ignited by compression heating of the premixed charge and potentially the burning premixed charge. Assuming combustion phasing of the premixed charged is controlled, the relatively short and easy to predict delay between the start of the direct injection process and the subsequent ignition of that fuel helps to ensure that the fuel will burn when desired while imparting additional energy to the engine.

A more auto-ignitable pilot fuel can be added and mixed with a premixed fuel/air charge early in the compression stroke to help ensure auto-ignition of the charge (see U.S. Patent Application Publication No. US 2002/0078918 A1 and U.S. Pat. No. 6,230,683). The fueling strategy that employs a premixed fuel/air charge with or without an injection of pilot fuel during the intake or early in the compression stroke, where the early pilot is employed to modify the auto-ignition properties of the premixed fuel/air and where a supplemental quantity of directly injected fuel is also provided to extend the load range of the engine will be referred to herein as a premixed charge combustion ignition engine with direct injection fueling (PCCI-DI) at or near top dead center (see U.S. Patent Application Publication No. US 2002/0078918 A1).

An important issue with PCCI-DI engines is the control of combustion phasing, herein referred to as controlling the start of combustion (SOC) of the premixed charge. That is, while ignition delays are inherent in spark-ignited applications and in applications that utilize a near top dead center (TDC) injection of auto-ignitable fuel to control SOC, these delays are understood in principle, relatively short and, therefore, relatively predictable. However, SOC in an PCCI-DI engine is driven by the properties of the premixed charge as it evolves for each cylinder during an intake and compression stroke, hence it is dictated strongly by variations including, but not limited to, intake temperature and pressure, humidity and fuel quality. The effect of each variable upon the evolution of mixture state results in an onset of combustion that is less easily predicted and controlled. Moreover, system variability can result in fuel/air mixtures with different thermodynamic states for each engine cylinder as the engine cycle evolves. Therefore, the onset of auto-ignition for each cylinder may not occur at the same engine crank angle.

Control of SOC from cylinder to cylinder (that is, cylinder balancing) is important. Therefore, direct SOC monitoring can be valuable. Accurately determining SOC from cycle-to-cycle requires an accurate sensor measurement for determining SOC such as cylinder pressure sensors, acoustic sensors and knock detectors, as well as a computationally efficient method to provide cycle-to-cycle results commensurate with the speed of the engine. As well, the ignition levers employed preferably provide accurate manageable control across the cylinders. Examples of such ignition levers that can help control SOC in PCCI-DI can be things such as direct controls on an ignition source (for example, glow plug temperature) or the timing and quantity of an injection of an auto-ignitable pilot fuel affecting the auto-ignition properties of the premixed charge. Prior, conventional control strategies for a PCCI-DI engine consider such factors as intake charge properties and exhaust gas properties to control the quality of cycle to cycle combustion without monitoring SOC (see U.S. Patent Application Publication No. US 2002/0078918 A1). Greater accuracy is desirable for control of a PCCI-DI. Direct estimation of SOC can provide this.

Herein, the term SOC (start of combustion) is used to refer to an indicator of the combustion phasing of the premixed part of the combustion event which, in general with a PCCI-DI engine, would include the fuel air charge created by the introduction of a first fuel, mixed with an air charge and a pilot fuel within the intake system and/or possibly the combustion chamber such that such premixed (or partially premixed) charge is available near the completion of the compression stroke of the engine or near the beginning of the power stroke of the engine. Persons skilled in the technology involved here will understand that there are many different ways of defining SOC or combustion phasing. Some of these methods include a consideration of the crank angle at which:

peak heat release occurs, a fraction of the premixed fuel energy has been released (for example, 10%), or a fraction of the total energy is released.

Note, for the purposes of this application a premixed charge is a charge that is introduced into the combustion chamber of an engine that is substantially mixed with air or oxygen prior to combustion of the fuel. As such, a premixed charge includes a fumigated charge inducted into the combustion chamber during the intake stroke, a fuel directly injected into an air charge during either compression or intake stroke of the piston, or other method of providing a fuel/air charge to the combustion chamber that is substantially mixed prior to initiation of combustion of that charge. A premixed charge can also include a charge of a mixed first fuel and second fuel and air that is auto-ignitable when the piston is near top dead center. In this case one of the fuels would be more auto-ignitable than the other fuel. A premixed charge will burn in a substantially homogeneous combustion mode.

The present method estimates SOC and applies that estimation to adjust SOC in subsequent cycles of an internal combustion engine. The present method also addresses the issue of computational efficiency.

SUMMARY OF THE INVENTION

The present method and apparatus determine SOC from cycle to cycle so that this information can be employed to vary an ignition lever available to the controller to adjust SOC to more closely match a target SOC.

An important utility of the present method and apparatus is the application of the disclosed SOC controls on PCCI-DI engines fueled by gaseous fuels that, in general, can be difficult to auto-ignite. Where PCCI-DI is employed, a pilot quantity of diesel fuel may be injected early in the compression stroke or during the intake stroke to change the auto-ignition properties of an intake charge of premixed gaseous fuel. Alternatively, a fuel that auto-ignites can be readily introduced into the intake system, for example with a port fuel injector. The quantity of pilot fuel is an ignition lever dictating the SOC timing in a given cycle. As pilot quantity can be changed quickly from cycle-to-cycle, estimated SOC can be employed by the controller to adjust the quantity of pilot fuel introduced into the combustion chamber thereby adjusting SOC for subsequent cycles. This provides for a fast acting control of combustion.

Other ignition levers that can be employed to control timing of the SOC include pilot timing, intake manifold temperature, valve timing, equivalence ratio of the fuel, compression ratio, timing of the directly injected quantity of fuel and glow plug temperature or the properties of the directly injected quantity of fuel when hot surface ignition is employed. The method disclosed is useful for affecting the SOC controls noted above.

An embodiment of the present method for controlling combustion of a fuel within a combustion chamber of an internal combustion engine comprises introducing an intake charge into the combustion chamber during an intake event of a cycle of the engine, the piston partially defining the combustion chamber. Also, a first quantity of the fuel is introduced into the combustion chamber during the intake event or a compression event of the cycle, wherein the first quantity of the fuel and the intake charge are compressed and premixed at or near completion of the compression event. A second quantity of the fuel is directly injected into the combustion chamber when the piston is near top dead center and the fuel is burned in the combustion chamber during a power stroke of the cycle. A pre-combustion sensor signal (P(A)), determined prior to combustion of the first quantity of the fuel, and a first post-ignition sensor signal (P(B)), determined during combustion of the fuel, are delivered to a controller. The sensor signals are indicative of a pressure within the combustion chamber. An estimated SOC of the first quantity of the fuel is calculated from the pre-combustion sensor signal and the first post-ignition sensor signal, all of which is done in a given cycle of the engine. Then in a subsequent cycle of the engine, an ignition lever is varied if the estimated SOC of the first quantity of the fuel is different than a predetermined target SOC of the first quantity of the fuel.

In a preferred method, the estimated SOC is determined by employing a ratio of the pre-combustion sensor signal and the first post-ignition sensor signal or employing the difference between these signals.

The method further comprises delivering to the controller, a second post-ignition signal (P(C)) determined prior to completion of a power stroke of the cycle. This signal is also employed to estimate SOC of the first quantity of the fuel within the combustion chamber.

In a further embodiment, an estimated SOC is also determined by employing at least one ratio of the pre-combustion sensor signal and at least one of either the first or second post-ignition sensor signal where the estimated SOC is directly proportional to the ratio.

In a further embodiment of the present method, a first pre-determined constant ($K_1$) and a second predetermined constant ($K_2$) are employed to determine the estimated SOC, the estimated SOC being equal to $K_1 P_{ratio} + K_2$. The first post-ignition sensor signal is determined at a first crank angle, that is less than a peak pressure crank angle which corresponds to a peak cylinder pressure. The second post-ignition sensor signal is determined at a second crank angle, greater than the peak pressure crank angle.

In another embodiment of the present method, the first post-ignition sensor signal is determined at a first crank angle greater than a peak pressure crank angle corresponding to a peak cylinder pressure within the combustion chamber during the cycle of the engine.

In another embodiment of the present method, the ratio is $$\frac{P(B)}{P(A)} + \frac{P(C)}{P(A)}.$$

The predetermined target SOC can be set by the controller based on an engine speed indicative of a cycle engine speed during the cycle, and a boost pressure indicative of an engine load during the cycle, which in a preferred embodiment, can be measured.

In another embodiment of the present method, the ratio includes a first ratio being $$\frac{P(B)}{P(A)}$$

and a second ratio being $$\frac{P(C)}{P(A)}.$$

The first and second ratios being indicative of a first estimated SOC and a second estimated SOC respectively, which are, in turn, indicative of the estimated SOC.

In another embodiment of the present method, an n number of constants are employed to determine the estimated SOC. The estimated SOC is equal to the relationship $$K_1(P_{ratio})^{n-1} + K_2(P_{ratio})^{n-2} \ldots K_{n-1}(P_{ratio}) + K_n.$$

In a further embodiment of present method, the ignition lever is glow plug temperature. The engine would comprise a glow plug in fluid communication with the combustion chamber.

The ignition lever can also comprise the first quantity of fuel, which comprises a first fuel and a pilot fuel. The second quantity of the fuel comprises a second directly injected fuel, with the pilot fuel being more auto-ignitable than the first fuel. In another embodiment, the pilot fuel is directly injected into the combustion chamber and, in a further embodiment, the ignition lever can be one of pilot fuel quantity, pilot fuel timing and first fuel quantity.

In another embodiment, the first fuel is the same as the second injected fuel. Also, both can be gaseous fuels, preferably one of hydrogen and natural gas or a mixture of gaseous fuels comprising at least one of hydrogen and natural gas. In a preferred example the first fuel comprises hydrogen and the second injected fuel comprises natural gas.

A preferred embodiment of the present apparatus controls SOC of a fuel in a combustion chamber of an internal combustion engine. The engine comprises an injector and a manifold for introducing the fuel into the combustion chamber and the control apparatus comprises a controller, in communication with an ignition lever capable of adjusting SOC of the fuel within the combustion chamber. The controller also comprises a sensor, in communication with the controller, for directing a pre-combustion signal and a post-ignition signal to the controller. The signals are indicative of changes in pressure in the combustion chamber and the controller is capable of directing the ignition lever based on the pre-combustion signal and the post-ignition signal.

In another embodiment of the present apparatus, the sensor can be an optical sensor in direct communication with the combustion chamber and disposed in a fire deck. The fire deck partially defines the combustion chamber. The sensor can also be a strain gauge in communication with the fire deck.

In another embodiment of the present apparatus, the fuel comprises a first fuel, a pilot fuel that is more auto-ignitable than the first fuel and a second injected fuel.

In a further embodiment of the present apparatus, the injector is capable of injecting and adjusting the timing and quantity of the pilot fuel and injecting the second injected fuel. The ignition lever can be the quantity or timing of the pilot fuel, or a glow plug in fluid communication with the combustion chamber. A quantity of the first fuel can also be adjusted in the manifold where the quantity of the first fuel is the ignition lever. The pilot fuel can be diesel fuel. The first fuel can have the same or substantially the same composition as the second injected fuel and both can be gaseous fuels where, preferably, one is hydrogen and/or natural gas.

In another embodiment of the present method, combustion of a main fuel is controlled within a combustion chamber of an internal combustion engine. The method comprises introducing an intake charge into the combustion chamber during an intake event of a cycle of the engine, introducing a first quantity of the main fuel into the combustion chamber during the intake event or a compression event of the cycle and introducing a first quantity of a pilot fuel into the combustion chamber at a pilot timing during the intake event or the compression event of the engine. The first quantity of the main fuel, the first quantity of the pilot fuel and the intake charge are compressed and premixed into an auto-ignitable fuel/air charge at or near completion of the compression event. The pilot fuel is more auto-ignitable than the main fuel. A second quantity of the main fuel is directly injecting into the combustion chamber when the piston is near top dead center. A pre-combustion sensor signal (P(A)) determined prior to combustion of the auto-ignitable fuel/air charge and at least one post-ignition sensor signal determined during combustion of the main fuel, are delivered to a controller. The sensor signals are indicative of a pressure within the combustion chamber. All of this occurs during a cycle of the engine. At least one ratio ($P_{ratio}$) is calculated from the pre-combustion sensor signal and the post-ignition sensor signal. The ratio is indicative of an estimated SOC of the auto-ignitable fuel/air charge within the combustion chamber. A first quantity of the pilot fuel, the pilot timing or the first quantity of the main fuel are then varied in a subsequent cycle of the engine where the estimated SOC of the auto-ignitable fuel/air charge is different than a predetermined target SOC of the auto-ignitable fuel/air charge.

In another embodiment of the foregoing method, two post-ignition sensor signals are delivered to the controller: a first post-ignition sensor signal (P(B)) and a second post-ignition sensor signal (P(C)). The first post-ignition sensor signal is determined at a first crank angle, which is less than a peak pressure crank angle, corresponding to a peak cylinder pressure within the combustion chamber during the cycle of the engine. The second post-ignition sensor signal can be determined at a second crank angle, greater than the peak pressure crank angle.

In another embodiment, the ratio is $$\frac{P(B)}{P(A)} + \frac{P(C)}{P(A)}.$$

The estimated SOC is calculated from this ratio.

In another embodiment of the foregoing method, a first pre-determined constant ($K_1$) and a second predetermined constant ($K_2$) are employed to determine the estimated SOC, the estimated SOC being equal to $K_1 P_{ratio} + K_2$.

This method can be practiced with the main fuel being a gaseous fuel. The method can also be practiced wherein the gaseous fuel is one of hydrogen and natural gas or comprises at least one of either gaseous fuel.

BRIEF DESCRIPTION OF THE DRAWINGS

FIG. 1c. The piston is shown near top dead center after or near the completion of a compression stroke in FIG. 1d. FIGS. 1e and 1f show the combustion chamber during the power stroke and the exhaust stroke, respectively.

DETAILED DESCRIPTION OF PREFERRED EMBODIMENT(S)

A method is provided for calculating the SOC of a premixed charge of air and fuel within a combustion chamber of an internal combustion engine and applying that method to control SOC of a premixed charge of fuel subsequently introduced into the combustion chamber of an internal combustion engine.

Further, a method to affect the auto-ignition properties of a premixed charge of air and fuel by controlling the quantity and stratification of a relatively easy to auto-ignite fuel into the charge is disclosed.

Figure 1:
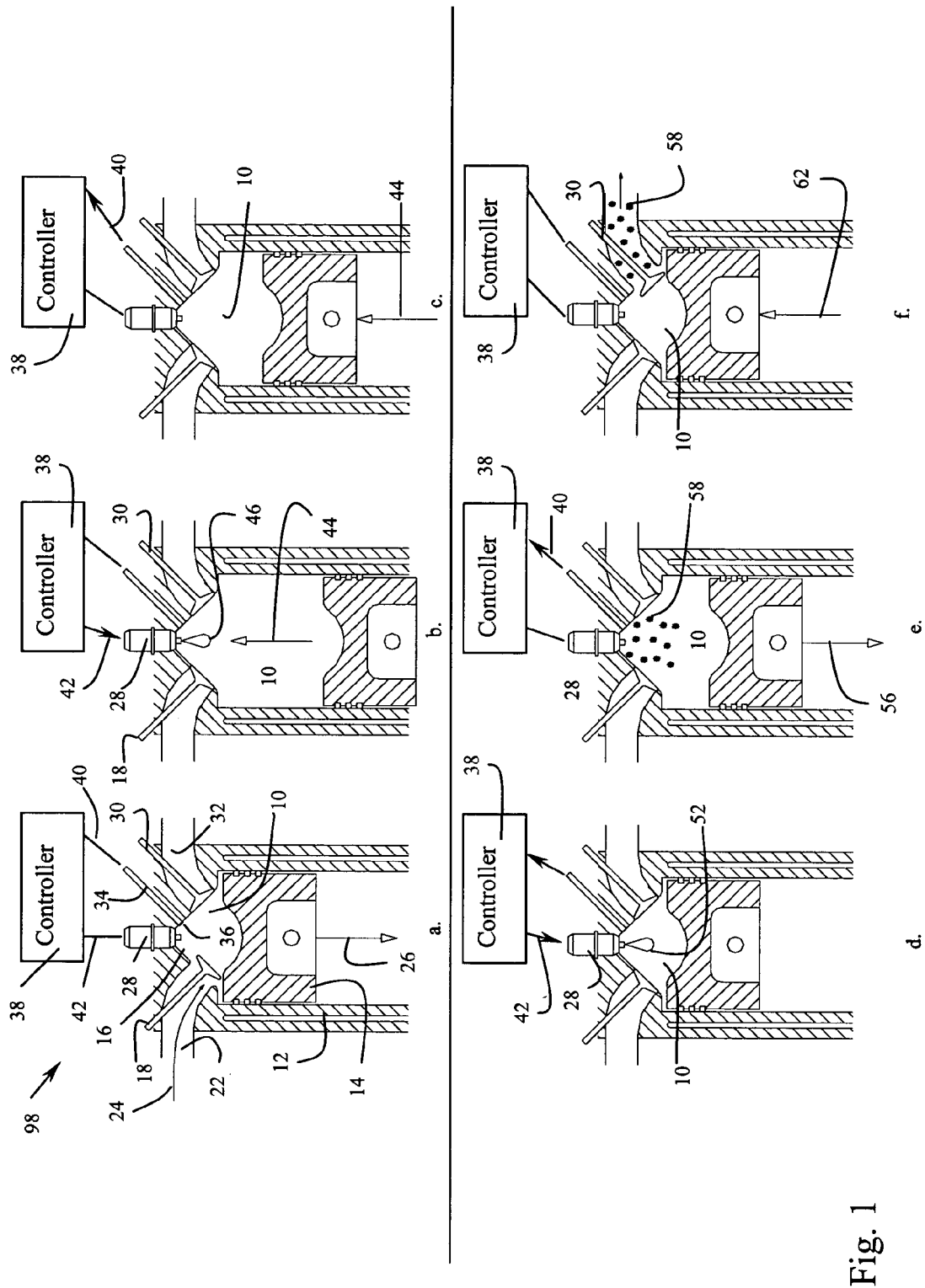
FIG. 1 shows a cross section of the combustion chamber for an internal combustion engine through the four strokes of a four-stroke cycle engine. The intake stroke is shown in FIG. 1a. The compression stroke is shown in FIG. 1b.

Referring to FIG. 1, a series of six figures, a through f, provide the operational strategy over the course of an engine cycle, beginning with the commencement of an intake stroke, FIG. 1a, and finishing off with the final stages of the exhaust stroke, FIG. 1f.

Specifically, referring to FIG. 1a, combustion chamber 10 of internal combustion engine 98 is defined by cylinder 12, piston 14 and fire deck 16. Piston 14 is commencing an intake stroke. Intake valve 18 is opened to allow a fuel air charge or air intake charge to be drawn into chamber 10 through an intake line as demonstrated by arrow 24. A portion of intake line 22 is shown. During the intake stroke, piston 14 is moving in the direction of arrow 26 toward the bottom of cylinder 12. Injector 28, exhaust valve 30 and a portion of exhaust line 32 are also shown. In the embodiment shown, sensor 34 is disposed through fire deck 16, with membrane 36 approximately flush with the interface between fire deck 16 and combustion chamber 10. It should be noted that an alternative embodiment is one where the membrane is connected to the combustion chamber through a passage. Signals are provided to controller 38 through line 40 from sensor 34 and through line 42 to injector 28 from controller 38.

Referring to FIG. 1b, piston 14 is near bottom dead center and in the process of a compression stroke as indicated by arrow 44. During this early stage of the compression stroke in the embodiment provided, pilot fuel 46 is injected into the combustion chamber through injector 28 as commanded by controller 38 directing an injection signal to injector 28 as indicated by the arrow on line 42. Inside the combustion chamber, pilot fuel 46 begins mixing with the intake charge. Both intake valve 18 and exhaust valve 30 are closed.

Referring to FIG. 1c, piston 14 is shown prior to combustion late in the compression stroke. A pressure measurement from sensor 34 can be directed through line 40 to controller 38 as indicated by the arrow on line 40.

Near top dead center, in the embodiment provided, as shown in FIG. 1d, supplemental fuel injection 52 is provided into the combustion chamber as directed by a signal from controller 38 as indicated by the arrow on line 42. Combustion of the charge within the combustion chamber has likely commenced by this point. A signal is measured by sensor 34 and sent to controller 38 as indicated by the arrow on line 40.

Referring to FIG. 1e, piston 14 is in the early stages of a power stroke, where the premixed fuel provided in the intake stroke and/or the compression stroke and the directly injected fuel provided near top dead center burn, thereby driving piston 14 in the direction of arrow 56. Combustion products 58 resulting from burned fuel begin forming within combustion chamber 10. Also, at this point in the engine cycle, a pressure signal can be provided to controller 38 by sensor 34 along line 40 as indicated by the arrow provided.

Finally, referring to FIG. 1f, exhaust gases 58 are directed from combustion chamber 10 by piston 14 moving in the directing indicated by arrow 62 while exhaust valve 30 is open.

Generally, FIGS. 1a through 1f represent a preferred embodiment of the operation of the combustion chamber in the present method is employed. Combustion of a fuel drives the piston. In this preferred embodiment, the fuel is made up of a main fuel and a pilot fuel, combustion of the main fuel being aided by an injection of a pilot fuel that is more auto-ignitable than the main fuel. The injection of pilot fuel 46 shown in FIG. 1b is early enough in the compression stroke that it substantially mixes with the intake charge (made up of air and a main fuel) changing the auto-ignition characteristics of that charge (creating an auto-ignitable fuel/air charge) to promote combustion when the fuel/air mixture in combustion chamber 10 are near the end of the compression stroke or at the beginning of the power stroke (near top dead center).

This method of driving a piston during the power stroke is dependent on the properties of the charge within combustion chamber 10 when piston 14 is near top dead center. Combustion of the charge can be difficult to control in light of system variability and the delay between the injection of pilot fuel 46 and completion of the compression stroke, see FIG. 1d. According to the preferred method, sensor 34 is employed to monitor the SOC within chamber 10. The resulting information is employed to vary the quantity of pilot fuel 46 employed from cycle to cycle to affect the auto-ignition properties of premixed charge such that SOC in subsequent cycles of the engine is driven to a desirable point within the engine cycle. The present method monitors pressure over the course of an engine cycle to control SOC where discrete samples of the signal are made.

Specifically, referring to FIGS. 1c, 1d and 1e, three sensor readings are taken. A pressure reading within combustion chamber 10 is taken by sensor 34 and delivered to controller 38 prior to combustion (see FIG. 1c). A second pressure reading is taken by sensor 34 after commencement of combustion. This is, generally, early in the power stroke of piston 14 (see FIG. 1d). A third reading is taken later in the power stroke (see FIG. 1e). Both the second and third readings are, preferably, taken during combustion of the fuel. These measurements are then combined mathematically and compared against a target value to provide closed-loop adjustment of pilot quantity. As such, the auto-ignition properties of the premixed charge are adjusted to match a desired SOC timing. Generally, pilot quantity is reduced if combustion occurred too early in cycle and increased if it occurred too late relative to the target SOC.

As noted above, other ignition levers can also be employed depending on the fuels and engine used to affect SOC from cycle to cycle.

Typical sensors are AC coupled. This can prevent them from measuring the DC component. As would be understood by persons skilled in the technology involved here, "pegging" is employed to secure this component. Pegging of a cylinder pressure measure is performed, for example, by shifting the entire cylinder pressure signature positively or negatively by a fixed quantity to align a measured intake manifold pressure and the cylinder pressure during the intake stroke, or when the piston is near bottom dead center. Regarding the present disclosure, a pegging strategy that can be employed shifts the entire pressure-indicative trace by a fixed positive or negative amount so that a value during the intake stroke or near bottom dead center is set to zero. Mathematically, this removes dependence of the present method on the sensor's calibration factor, thus making the approach less sensitive to drifting in the sensor calibration.

Figure 2:
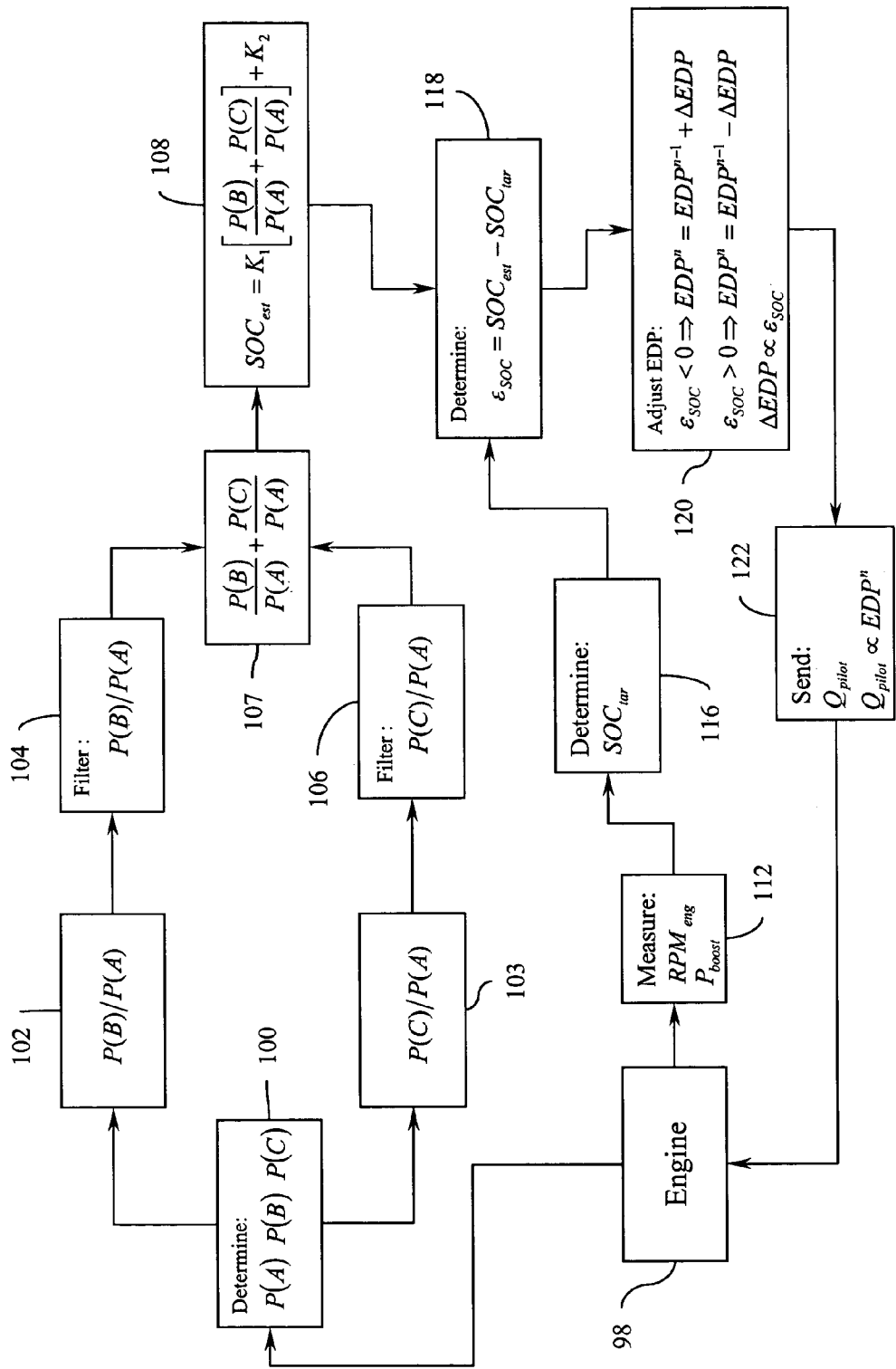
FIG. 2 shows a control flow chart of the present method of controlling an internal combustion engine using combustion chamber pressure sensing.

Referring to FIG. 2, a flow diagram is provided setting out the present method for controlling timing of SOC in the present PCCI-DI combustion mode noted above. Reference is made to engine 98 described above in FIG. 1 and carried over to the flow diagram of FIG. 2. Pressure-indicative sensor signals 100 are first determined by sensor 34 (see FIG. 1) at A crank angle degrees before top dead center, P(A), and at B and C crank angle degrees after top dead center, P(B) and P(C), respectively. Pressure-indicative sensor signals 100 are employed to calculate ratio 102 of P(B) to P(A) and ratio 103 of P(C) to P(A). Filters 104, 106 are applied to each of ratios 102, 103 to smooth data collected from cycle to cycle. By way of example, an RC-filter could be applied over a window of several engine cycles. These filtered ratios are added together at $P_{ratio}$ step 107 and correlated at step 108 to determine an SOC estimate (SOC$_{est}$).

The method employs measured values for engine speed (RPM$_{eng}$) and boost pressure (P$_{boost}$), step 112, from engine 98. These values are employed to establish an SOC target (SOC$_{tar}$) 116 which can be generally done correlating RPM$_{eng}$ and P$_{boost}$ to the corresponding SOC$_{tar}$ from a look-up table, where it would be understood by persons skilled in the technology involved here that other parameters indicative of load and speed could be employed as the axes of the look-up table. SOC error ($\epsilon_{soc}$) 118 is then determined considering the difference between SOC$_{est}$ from SOC step 108 and SOC$_{tar}$ from step 116. $\epsilon_{soc}$ from step 118 is then employed in one or more subsequent cycles to adjust pilot flow (Q$_{pilot}$) based on the adjusted early pilot quantity (EDP$^n$) which is, in turn, determined from previous early diesel pilot quantity (EDP$^{n-1}$) and the desired change in that quantity ($\Delta$EDP) found from $\epsilon_{soc}$. EDP$^n$ is found in step 120 and converted to a new Q$_{pilot}$ in step 122. As shown, Q$_{pilot}$ is sent to engine 98, and specifically injector 28 referring to FIG. 1b.

In practice, the illustrated embodiment employs controller 38, as shown in FIG. 1a through 1f, to perform steps 102, 103, 104, 106, 107, 108, 118, 116, 120 and 122 once fed values corresponding to data considered in steps 100 and 112.

Figure 3:
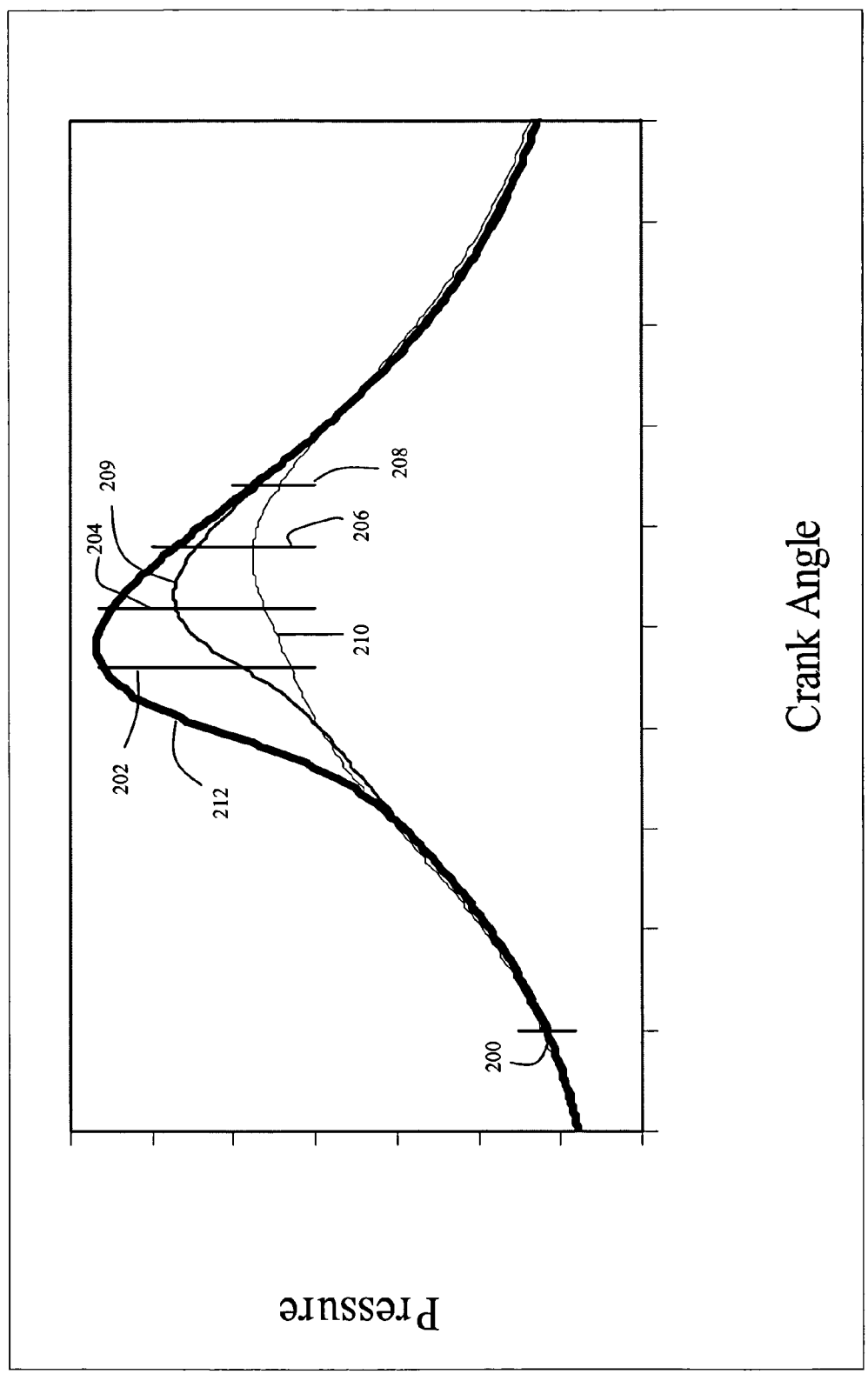
FIG. 3 shows a graph of pressure within the combustion chamber versus crank angle.

Referring to FIG. 3 as an example, where the pressure-indicative signal is cylinder pressure measured from an in-cylinder pressure sensor, a graph plotting pressure against crank angle over the later part of a compression stroke and the beginning of a power stroke for engine 98 is shown. Sample values for A, see line 200, as well as potential angles for B and C are provided, indicated by lines 202, 204, 206 and 208. In addition, each of lines 200, 202, 204, 206 and 208, intersect three sample pressure curves. Pressure curve 209 shows normal or target behavior for the engine. That is, combustion has commenced where desired for the demands placed on engine 98 by the user. Retarded combustion curve 210 and advanced combustion curve 212 are provided as well.

Crank angle A is chosen during the compression stroke prior to the commencement of combustion. This pressure-indicative signal, preferably, should be relatively high (as compared to a baseline pressure-indicative signal at such timing as bottom dead center where the pegging routine is expected to applied) to increase or maximize the signal to noise ratio inherent to the measured signal. Hence, it is beneficial that A be recorded at a crank angle late in the compression stroke; however, it is highly desirable that A is recorded at a crank angle prior to onset of combustion. Line 200, from FIG. 3, intersects the three curves, 209, 210 and 212, at angle A. An example value is 32 crank angle degrees prior to top dead center.

Crank angles, B and C are preferably chosen near the peak of the cylinder pressure-indicative signal with a few degrees between them, and preferably on either side of peak cylinder pressure-indicative signal. While in general it may not be necessary to employ more than one sensor signal post-ignition, a sensor reading at both crank angle B and C is preferred. Introducing a second reading after commencement of combustion helps ensure that spikes in the pressure-indicative signal due to very early or very late combustion are sampled accurately. Where a reading at crank angle B and C are employed, a more robust algorithm is introduced that reflects the pressure trend between crank angles B and C and, consequently, helps to ensure a unique correlation between $P_{ratio}$ and SOC. A single point is not capable of detecting such a signal trend within a single cycle of the engine. In any event, it may be satisfactory for the application contemplated to rely on the single post-ignition signal, B or C, and apply it as taught below where equation 2 would not include P(C)/P(A) or P(B)/P(A), as the case may be, for determining $P_{ratio}$.

For example, referring to FIG. 3, relying on a pressure reading at C alone fails to reflect a trend for pressure and can affect accuracy of the resulting adjustment to SOC. For example, if C were chosen at the point corresponding with line 204, it may be unclear which side of the peak of each of curves 209, 210 and 212, the pressure measurement was taken. That is, where early combustion occurs, C at line 204 is on the right side of the peak of this curve. The single-point algorithm may fail to recognize this and assume C was measured at the corresponding pressure found on the left side of the peak of curve 212 resulting in an $SOC_{est}$ value that is more retard than the true SOC.

Conversely, while accuracy in determining $SOC_{est}$ is enhanced with two or more readings after combustion has commenced, the additional computational time in employing more than 3 total readings can be prohibitive with relatively limited improvement to the robustness of the system. However, as would be understood by persons skilled in the technology involved here, the present method will also operate effectively with additional readings after the commencement of combustion if computer processors are introduced with computing speeds fast enough to handle a greater number of readings.

Preferably, two readings after commencement of combustion provide accuracy without undue burden on the computational capacity of controller 38.

Further, it is preferred that post-ignition sensor signals be centered around the peak in the cylinder pressure-indicative signal, and hence typically chosen during the combustion of the premixed fuel/air. It is expected, however that an estimate of SOC can be made, in any event, as long as the post-ignition sensor signals are provide during the power stroke.

Considering each step of the method set out in FIG. 2 for the mode of operating an internal combustion engine described in FIG. 1, the following provides the relationship employed to determine $SOC_{est}$:

$$SOC_{est} = K_1 P_{ratio} + K_2 \quad (1)$$

where $$P_{ratio} = \left[ \frac{P(B)}{P(A)} = \frac{P(C)}{P(A)} \right] \quad (2)$$

and P(A), P(B) and P(C) are the pressure-indicative measurements (or more specifically, the sensor measurements) at crank angle locations A, B and C. Referring again to FIG. 2, the ratio P(B)/P(A) calculated at step 102 and P(C)/P(A) calculated at step 103 are employed to determine $SOC_{est}$. The use of ratios allow dependence on sensor gain to be reduced or eliminated.

Constants $K_1$ and $K_2$ are predetermined for the engine based on the linear relationship of $SOC_{est}$ versus $P_{ratio}$.

Figure 4:
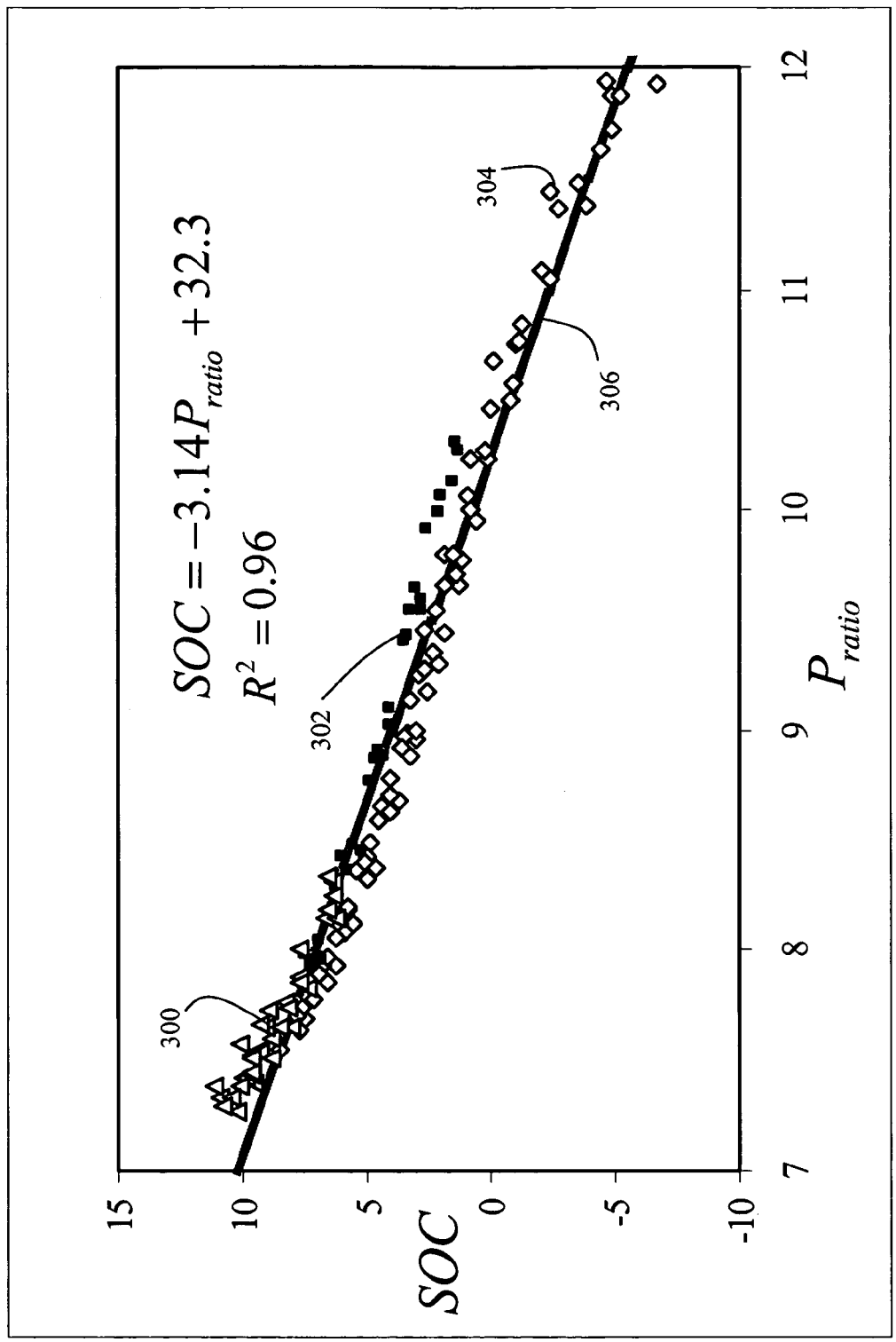
FIG. 4 shows a correlation line of SOC versus pressure ratio for determining and adjusting SOC in a PCCI-DI engine.
Figure 5:
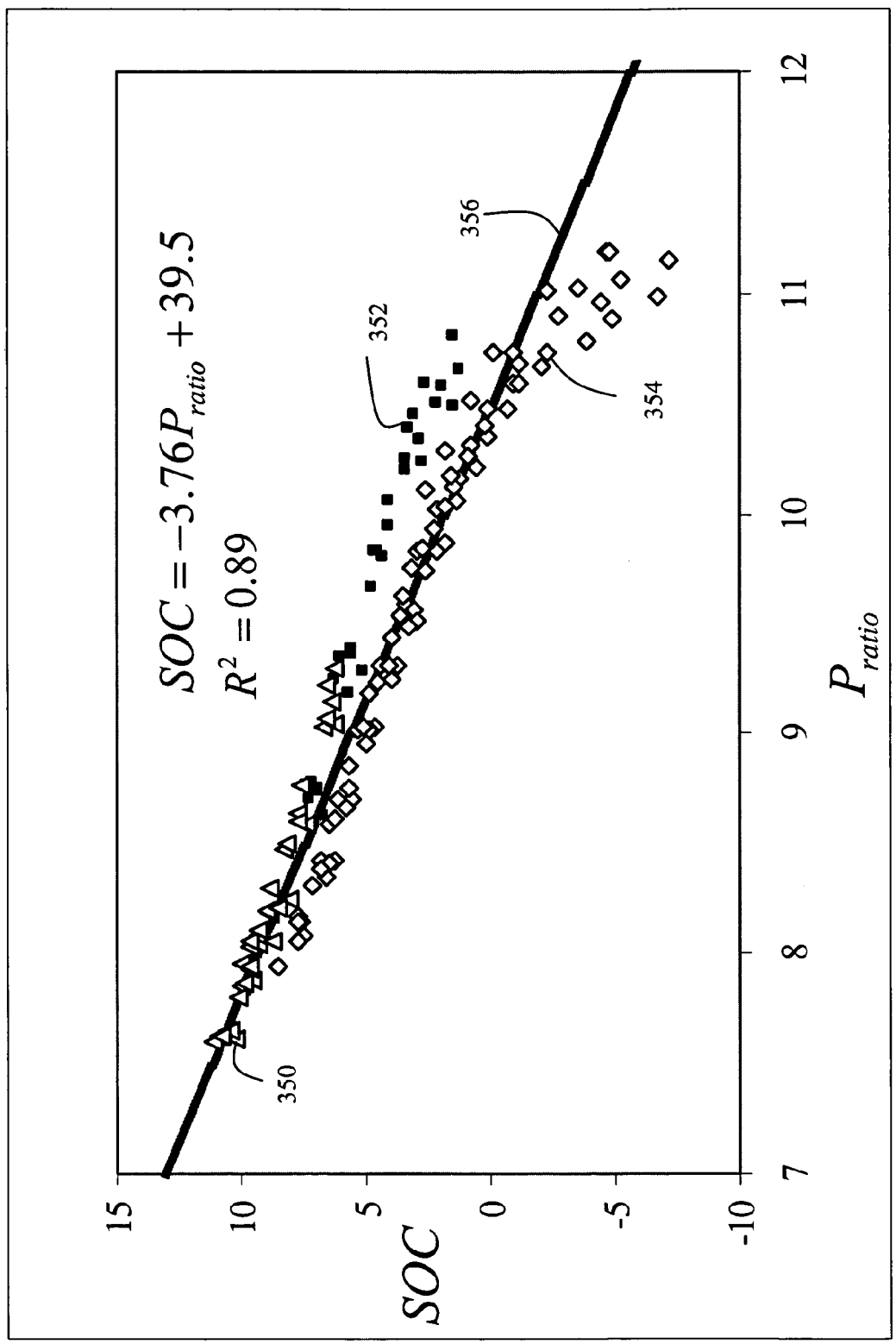
FIG. 5 shows a second correlation line of SOC versus pressure ratio for determining and adjusting SOC in a PCCI-DI engine.

Referring to FIGS. 4 and 5, an example of the linear relationship between actual measured SOC ($SOC_{msd}$) and $P_{ratio}$ is provided for an PCCI-DI engine for two different values of B and C. The value of B in FIG. 4 is earlier in the engine cycle than B in FIG. 5. The value of C in FIG. 4 is earlier, in the engine cycle, than C in FIG. 5. In FIGS. 4 and 5, $SOC_{msd}$ against $P_{ratio}$ are plotted under three different load conditions to allow for a slope that is indicative of various points on the engine map.

Referring specifically to FIG. 4, points 300 shows $SOC_{msd}$ plotted against $P_{ratio}$ for a high load condition. Points 302 show $SOC_{msd}$ plotted against $P_{ratio}$ for a mid-load range. Points 304 show $SOC_{msd}$ plotted against $P_{ratio}$ for a low load condition. Line 306 then represents the best fit through points 300, 302 and 304. $K_1$ is the slope of line 306. $K_2$ is the intercept point.

Referring to FIG. 5, a second plot is provided that shows $SOC_{msd}$ plotted against $P_{ratio}$ for a second set of values for B and C as noted above. Again, points 350, 352 and 354 represent values at high, medium and low load conditions. Line 356 provides the best fit through these values where $K_1$ and $K_2$ are the slope and intercept of line 356 for the chosen B and C, respectively.

A variety of different values of B and C, and, for that matter, A, values can be chosen to derive a number of different relationships between $SOC_{msd}$ and $P_{ratio}$. Moreover, it is not necessary to derive the relationship for different load conditions and, conversely, additional accuracy can be found by including even more than the three load conditions demonstrated in the two diagrams. In general, however, a single relationship for the engine under consideration must be chosen. The value of the best fit ($R^2$) as well as the sensitivity of the relationship derived will help to determine the best choices for A, B and C for the engine under consideration. Sensitivity, S, can be determined by:

$$S = \frac{d\left[\frac{P(B)}{P(A)} + \frac{P(C)}{P(A)}\right] \Big/ d[SOC_{msd}]}{\left[\frac{P(B)}{P(A)} + \frac{P(C)}{P(A)}\right]} \quad (3)$$

This ratio provides for a desirable rate of change in the linear relationship that responds meaningfully to relatively small changes in the pressure-indicative ratio.

Referring again to FIGS. 4 and 5, example values of A, B and C are employed for a particular engine. These are 30, 6 and 12 in FIG. 4 and 30, 12 and 18 in FIG. 5 for each of A, B and C, respectively. The result is line 306 and line 356. The value of the best fit, $R^2$, is better for line 306 than is the case for line 356. However, S for line 356 is better than is the case for line 306. The best fit in this case would probably point to use of $K_1$ and $K_2$ of −3.14 and 32.3, respectively, in this example over the values provided by line 356. That is, the difference in $R^2$ outweighs the difference in S between the two lines, 306 and 356, for this particular example.

Note that additional accuracy for $K_1$ and $K_2$ over discrete ranges of the engine map can also be determined by securing a best fit line through each of the points plotted for a given load. That is, in the example of FIG. 4, three lines could be found from the best fit through points 300, 302 and 304 resulting in three distinct values for $K_1$ and $K_2$. The controller would employ the appropriate value of $K_1$ and $K_2$ when the user demands that the engine operate within a corresponding load range on the engine map. Small differences in $K_1$ and $K_2$ in different local regions of the engine map are identified and bounded where boost pressure (as a measure of engine load, for example) is sent to the controller resulting in values for $K_1$ and $K_2$. More or less than three regions resulting in three constant values sets, $K_1$ and $K_2$, may be identified.

It is understood that some combinations of sensor signals, crank angle choices of measurements and SOC indicators may require higher order relationships between $SOC_{est}$ and $P_{ratio}$ for best fit or may yield better accuracy between $SOC_{est}$ and $P_{ratio}$ when higher order relationships are employed. It is further understood that persons skilled in the technology involved here could derive higher order correlations coefficients from the methods described in this disclosure.

$SOC_{msd}$ can be determined from a laboratory grade cylinder pressure transducer measuring actual SOC, as would be understood by persons skilled in the technology involved here.

Returning to FIG. 2, with $K_1$ and $K_2$ predetermined, $SOC_{est}$ is found as shown in step 108. This is then employed to determine, in step 118, $\epsilon_{soc}$ between $SOC_{est}$ and $SOC_{tar}$, which is derived in step 116 from a look-up table, referencing for example measured values for boost pressure and engine speed sent from engine 98 to the controller as shown in step 112. $\epsilon_{soc}$ is:

$$\epsilon_{soc} = SOC_{est} - SOC_{tar}$$

With $\epsilon_{soc}$, a $\Delta EDP$ is found and employed to adjust the previous commanded injection timing $EDP^{n-1}$ to determine $EDP^n$ as shown in step 120 where:

$$\epsilon_{SOC} < 0 \Rightarrow EDP^n = EDP^{n-1} + \Delta EDP \tag{4}$$

$$\epsilon_{SOC} > 0 \Rightarrow EDP^n = EDP^{n-1} - \Delta EDP \tag{5}$$

$$\Delta EDP \propto \epsilon_{SOC} \tag{6}$$

$EDP^n$ is then employed to determine a command $Q_{pilot}$ for a subsequent pilot injection which is directed to engine 98 where $Q_{pilot} \propto \epsilon_{SOC}$: see step 122.

In general, while not necessary for the operability of the present method and apparatus, $\epsilon_{soc}$ can be assumed to be zero if it is within 0.2 crank angle degrees of $SOC_{tar}$. The preferred method is to take action upon statistical significant changes in the measured signal.

There is a direct relationship between $\epsilon_{soc}$ and the adjusted quantity of pilot, $EDP^n$, that is $\Delta EDP \propto \epsilon_{SOC}$ for a given set of engine conditions that results in the control of combustion from cycle to cycle. Increasing the pilot quantity advances combustion, where engine testing would be employed to calibrate the system response and hence determine the relationships between, $Q_{pilot} \propto \epsilon_{SOC}$ as well as $\Delta EDP \propto \epsilon_{SOC}$, as would be understood by person skilled in the technology involved here.

While equation 2 above employs an additive value to determine $P_{ratio}$ employing two post-ignition locations compared to a pre-combustion value, it is not necessary to limit the method to this means of determining $SOC_{est}$. It is also possible to estimate two independent $SOC_{est}$ values ($SOC_{est}^1$ and $SOC_{est}^2$) by reference to a first database or look-up table generated by a predetermined linear relationship between a measure set of SOC points and P(C)/P(A) and a second database or look-up table generated by another predetermined linear relationship between a measure set of SOC points and P(B)/P(A). Each estimated SOC, $SOC_{est}^1$ and $SOC_{est}^2$, determined for each $P_{ratio}$ would be averaged to provide $SOC_{est}$ and, from that, the $\epsilon_{SOC}$ over the $SOC_{tar}$. In general this method can be provided by the following:

$$SOC_{est} = (SOC_{est}^1 + SOC_{est}^2)/2 \tag{7}$$

where $$SOC_{est}^1 = K_1^1 P_{ratio}^1 + K_2^1 \tag{8}$$

$$SOC_{est}^2 = K_1^2 P_{ratio}^2 + K_2^2 \tag{9}$$

$$P_{ratio}^1 = \frac{P(C)}{P(A)} \tag{10}$$

$$P_{ratio}^2 = \frac{P(B)}{P(A)} \tag{11}$$

Also, $SOC_{est}$ need not be an actual SOC value but may just be the associated target pressure-indicative ratio corresponding to an estimated SOC. That is, equation 1 provides a means of estimating the SOC and, in turn, employing that to determine and SOC error, $\epsilon_{SOC}$. However, it would also be understood that the pressure-indicative ratio, for example, P(B)/P(A)+P(C)/P(A), could be directly employed and compared to the associated pressure-indicative ratio expected of $SOC_{tar}$ to determine $\epsilon_{SOC}$, based on the difference in the pressure-indicative ratio associated with $SOC_{tar}$ and $P_{ratio}$, see equation 2.

Furthermore, while ratios of pre-combustion and post-ignition signals are preferred, what is important is that the two values be compared to each other. The difference in pre-combustion and post-ignition signals can also be employed to determine estimated $SOC_{est}$. The important aspect is to determine the relationship between the signals provided. Among other factors, this helps to reduce or eliminate having to rely on the sensor to provide an accurate absolute measurement of pressure within the combustion chamber.

Note for the purposes of this application, signals provided by a sensor employed to determined SOC are not necessarily pressure measurements, per se, although reference is made throughout the disclosure to pressure measurements and pressure sensors and signals. As would be understood by persons skilled in the technology involved here, pressure measurement references include any signal provided by a sensor that is directly indicative of the pressure within the combustion chamber or the change in pressure in the combustion chamber. In addition to an optical sensor employed for embodiment discussed above, suitable such sensors include an automotive cylinder pressure transducer, a strain gauge instrumented injector hold-down clamp, a strain gauge instrumented probe that measures head deflection, a knock sensor, a piezoelectric washer on the hold-down bolt or head bolt, or other sensor mounted in a location where a signal that can be correlated to cylinder pressure. More generically, strain measurements on various engine components can be employed, where the strain correlates with the cylinder pressure. In most cases, an appropriate algorithm to provide data for the purposes of SOC control that is indicative of cylinder pressure, as understood by persons skilled in the technology involved here.

While the method described above, with premixed fuel and directly injected fuel, introduces a charge into the combustion chamber through the intake line, it is possible, as well, to introduce air alone into the combustion chamber through the intake line and manifold, supplementing this with fuel directly injected early in the compression stroke of the piston or during the intake stroke to ensure adequate mixing of the fuel with the intake air charge.

Also, as noted previously, while adjusting pilot quantities is a preferred method of adjusting SOC from cycle to cycle, other ignition levers can be employed. The controller could also direct changes in pilot timing in a pilot-fuelled engine or gaseous-fuelled engine that employs a pilot charge for ignition. Also intake manifold temperature, valve timing, equivalence ratio of the intake charge, compression ratio, and timing of the directly injected quantity of fuel influence SOC and therefore provide a means of varying SOC from cycle-to-cycle whether pilot fuel, auto-ignition of the main fuel, or hot surface ignition are employed.

Where hot surface ignition is employed, variations in glow plug temperature could be manipulated by the controller from cycle-to-cycle in response to SOC errors derived from the above taught method. The pressure, quantity and timing of a directly injected quantity of fuel guided to the glow plug for the purposes of ignition could also be changed to affect SOC in subsequent engine cycles.

Note also that present method is also applicable to a two-stroke cycle engine or rotary engines. As rotary engines are contemplated, an intake event, compression event, power event and exhaust event during an engine cycle include the four strokes (intake, compression, power and exhaust) and two strokes of a two-stroke reciprocating engine as well as the rotary engine events.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of controlling combustion of a fuel within a combustion chamber of an internal combustion engine, said method comprising:
   (a) during a cycle of said internal combustion engine:
      (1) introducing an intake charge into said combustion chamber during an intake event of said cycle, said combustion chamber partially defined by a piston,
      (2) introducing a first quantity of said fuel into said combustion chamber during said intake event or a compression event of said cycle, wherein said first quantity of said fuel and said intake charge are compressed and premixed at or near completion of said compression event,
      (3) directly injecting a second quantity of said fuel into said combustion chamber when said piston is near top dead center,
      (4) burning said fuel in said combustion chamber during a power event of said cycle,
      (5) to a controller, delivering a pre-combustion sensor signal (P(A)) determined prior to combustion of said first quantity of said fuel and a first post-ignition sensor signal (P(B)) determined during combustion of said fuel, said sensor signals being indicative of a pressure within said combustion chamber,
   (b) calculating an estimated SOC of said first quantity of said fuel within said combustion chamber from said pre-combustion sensor signal and said first post-ignition sensor signal,
   (c) during a subsequent cycle of said engine, varying an ignition lever if said estimated SOC of said first quantity of said fuel is different than a predetermined target SOC of said first quantity of said fuel.

2. The method of claim 1 wherein said estimated SOC is determined by employing a ratio of said pre-combustion sensor signal and said first post-ignition sensor signal.

3. The method of claim 1 wherein said estimated SOC is determined from a difference between said pro-combustion sensor signal and said first post-ignition sensor signal.

4. The method of claim 1 further comprising delivering to said controller, a second post-ignition signal (P(C)) determined prior to completion of said power event of said cycle, wherein said second post-ignition sensor signal is also employed to calculate said estimated SOC of said first quantity of said fuel within said combustion chamber.

5. The method of claim 4 wherein said estimated SOC is determined by employing at least one ratio ($P_{ratio}$) of said pro-combustion sensor signal and at least one of said first post-ignition sensor signal and said second post-ignition sensor signal.

6. The method of claim 5 wherein said first post-ignition sensor signal is determined at a first crank angle, said first crank angle being less than a peak pressure crank angle, said peak pressure crank angle corresponding to a peak cylinder pressure within said combustion chamber during said cycle of said engine.

7. The method of claim 1 wherein said first post-ignition sensor signal is determined at a first crank angle, said first crank angle being greater than a peak pressure crank angle, said peak pressure crank angle corresponding to a peak cylinder pressure within said combustion chamber during said cycle of said engine.

8. The method of claim 6 wherein said second post-ignition sensor signal is determined at a second crank angle, said second crank angle being greater than said peak pressure crank angle.

9. The method of any one of claims 5 and 8 wherein said at least one ratio is $$\frac{P(B)}{P(A)} + \frac{P(C)}{P(A)}.$$

10. The method of claim 5 wherein said estimated SOC is directly proportional to said at least one ratio.

11. The method of any one of claims 5 and 8 wherein a first pre-determined constant ($K_1$) and a second predetermined constant ($K_2$) are employed to determine said estimated SOC, said estimated SOC being equal to $K_1 P_{ratio} + K_2$.

12. The method of any one of claims 1 and 8 wherein said predetermined target SOC is set by said controller based on an engine speed indicative of a cycle engine speed during said cycle and a boost pressure indicative of an engine load during said cycle.

13. The method of claim 12 wherein said engine speed and said boost pressure are measured.

14. The method of any one of claims 5 and 8 wherein said at least one ratio includes a first ratio and a second ratio, said first ratio being $$\frac{P(B)}{P(A)}$$

and said second ratio being $$\frac{P(C)}{P(A)},$$

said first ratio being indicative of a first estimated SOC and said second ratio being indicative of a second estimated SOC, said first estimated SOC and said second estimated SOC being indicative of said estimated SOC.

15. The method of claim 14 wherein said first ratio and said second ratio are employed to calculate said first estimated SOC and said second estimated SOC, said first estimated SOC and said second estimated SOC being employed to determine said estimated SOC.

16. The method of claim 9 wherein an n number of constants are employed to determine said estimated SOC, said estimated SOC being equal to $K_1 (P_{ratio})^{n-1} + K_2 (P_{ratio})^{n-2} \ldots K_{n-1}(P_{ratio}) + K_n$.

17. The method of claim 1 wherein said ignition lever is glow plug temperature, said engine comprising a glow plug in fluid communication with said combustion chamber.

18. The method of claim 1 wherein said ignition lever is said first quantity of said fuel.

19. The method of any one of claims 1 through 8 wherein said first quantity of said fuel comprises a first fuel and a pilot fuel and said second quantity of said fuel comprises a second injected fuel, said pilot fuel being more auto-ignitable than said first fuel.

20. The method of claim 19 wherein said pilot fuel is directly injected into said combustion chamber.

21. The method of claim 20 wherein said ignition lever is at least one of pilot fuel quantity, pilot fuel timing and first fuel quantity.

22. The method of claim 21 wherein said first fuel and said second injected fuel have the same composition.

23. The method of claim 22 wherein each of said first fuel and said second injected fuel is a gaseous fuel.

24. The method in claim 23 wherein said gaseous fuel is one of hydrogen and natural gas.

25. The method of claim 24 wherein said first fuel comprises hydrogen and said second injected fuel comprises natural gas.

26. The method in any one of claims 1 through 8 wherein said fuel is a gaseous fuel.

27. The method in claim 26 wherein said gaseous fuel is one of hydrogen and natural gas.

28. The method in claim 27 wherein said gaseous fuel comprises at least one of hydrogen and natural gas.

29. A control apparatus for controlling SOC of a fuel in a combustion chamber of an internal combustion engine, wherein said fuel comprises a pilot fuel and a first fuel, said pilot fuel being more auto-ignitable than said first fuel, said engine comprising an injector and a manifold for introducing said fuel into said combustion chamber and, said control apparatus comprising:
(a) a controller, said controller being in communication with an ignition lever capable of adjusting SOC of said fuel within said combustion chamber, and
(b) a sensor for directing to said controller a pre-combustion signal and a post-ignition signal, said signals indicative of changes in pressure in the combustion chamber, said sensor in communication with said controller, and
wherein said controller is capable of directing said ignition lever in response to said pre-combustion signal and said post-ignition signal.

30. The control apparatus of claim 29 wherein said sensor is an optical sensor in direct communication with said combustion chamber.

31. The control apparatus of claim 30 wherein said sensor is disposed in a fire deck, said fire deck partially defining said combustion chamber.

32. The control apparatus of claim 31 wherein said sensor is a strain gauge in communication with said fire deck.

33. The control apparatus of claim 29 wherein said fuel further comprises a second injected fuel.

34. The control apparatus of claim 33 wherein said injector is capable of injecting, in addition to said second injected fuel, said pilot fuel and capable of adjusting timing and quantity of said pilot fuel.

35. The control apparatus of any one of claims 33 and 34, wherein said ignition lever is pilot fuel quantity.

36. The control apparatus of claim 34 wherein said ignition lever is said timing of said pilot fuel.

37. The control apparatus of claim 33, wherein a quantity of said first fuel is capable of being adjusted in said manifold, adjusting of said quantity of said first fuel being said ignition lever.

38. The control apparatus of claim 29 wherein ignition lever is a glow plug in fluid communication with said combustion chamber.

39. The control apparatus of claim 29 wherein said pilot fuel is diesel fuel.

40. The control apparatus of claim 33 wherein said first fuel and said second injected fuel have the same composition.

41. The control apparatus of claim 40 wherein each of said first fuel and said second injected fuel is a gaseous fuel.

42. The control apparatus of claim 29 wherein said main fuel is a gaseous fuel.

43. The control apparatus of claim 29 wherein said fuel is a gaseous fuel.

44. The control apparatus of claim 43 wherein said gaseous fuel is natural gas.

45. The control apparatus of claim 29 wherein said main fuel is a gaseous fuel and said pilot fuel is diesel fuel.

46. The control apparatus of claim 43 wherein said gaseous fuel comprises at least one of hydrogen and natural gas.

47. A method of controlling combustion of a main fuel within a combustion chamber of an internal combustion engine, said method comprising:
(a) during a cycle of said internal combustion engine:
(1) introducing an intake charge into said combustion chamber during an intake event of said cycle,
(2) introducing a first quantity of said main fuel into said combustion chamber during said intake event or a compression event of said cycle,
(3) introducing a first quantity of a pilot fuel into said combustion chamber at a pilot timing during said intake event or said compression event of said engine, wherein said first quantity of said main fuel, said first quantity of said pilot fuel and said intake charge are compressed and premixed into an auto-ignitable fuel/air charge at or near completion of said compression event said pilot fuel is more auto-ignitable than said main fuel,
(4) directly injecting a second quantity of said main fuel into said combustion chamber when a piston partially defining said combustion chamber is near top dead center,
(5) to a controller, delivering a pre-combustion sensor signal (P(A)) determined prior to combustion of said auto-ignitable fuel/air charge and at least one post-ignition sensor signal determined during combustion of said main fuel, said sensor signals being indicative of a pressure within said combustion chamber,
(b) calculating at least one ratio ($P_{ratio}$) from said pre-combustion sensor signal and said at least one post-ignition sensor signal, said at least one ratio being indicative of an estimated SOC of said auto-ignitable fuel/air charge within said combustion chamber,
(c) during a subsequent cycle of said engine, varying at least one of said first quantity of said pilot fuel, said pilot timing, said first quantity of said main fuel, if said estimated SOC of said auto-ignitable fuel/air charge is different than a predetermined target SOC of said auto-ignitable fuel/air charge.

48. The method of claim 47 wherein two post-ignition sensor signals are delivered to said controller, said two post-ignition sensor signals being a first post-ignition sensor signal (P(B)) and a second post-ignition sensor signal (P(C)).

49. The method of claim 48 wherein said first post-ignition sensor signal is determined at a first crank angle, said first crank angle being less than a peak pressure crank angle, said peak pressure crank angle corresponding to a peak cylinder pressure within said combustion chamber during said cycle of said engine.

50. The method of claim 49 wherein said second post-ignition sensor signal is determined at a second crank angle, said second crank angle being greater than said peak pressure crank angle.

51. The method of any one of claims 48 and 50 wherein said at least one ratio is $$\frac{P(B)}{P(A)} + \frac{P(C)}{P(A)}.$$

52. The method of claim 51 further comprising calculating said estimated SOC from said at least one ratio.

53. The method of claim 52 wherein a first pre-determined constant ($K_1$) and a second predetermined constant ($K_2$) are employed to determine said estimated SOC, said estimated SOC being equal to $K_1 P_{ratio} + K_2$.

54. The method of claim 52 wherein an n number of constants are employed to determine said estimated SOC, said estimated SOC being equal to $K_1(P_{ratio})^{n-1} + K_2(P_{ratio})^{n-2} \ldots K_{n-1}(P_{ratio}) + K_n$.

55. The method of claim 50 wherein said at least one ratio includes a first ratio and a second ratio, said first ratio being $$\frac{P(B)}{P(A)}$$

and said second ratio being $$\frac{P(C)}{P(A)},$$

said first ratio being indicative of a first estimated SOC and said second ratio being indicative of a second estimated SOC, said first estimated SOC and said second estimated SOC being indicative of said estimated SOC.

56. The method in any one of claims 49, 50 and 55 wherein said main fuel is a gaseous fuel.

57. The method in claim 56 wherein said gaseous fuel is one of hydrogen and natural gas.

58. The method in claim 57 wherein said gaseous fuel comprises at least one of hydrogen and natural gas.

* * * * *